US006897398B2

(12) United States Patent
Ogata et al.

(10) Patent No.: US 6,897,398 B2
(45) Date of Patent: May 24, 2005

(54) MACHINING MONITOR

(75) Inventors: Toshiyuki Ogata, Yamanashi (JP); Koji Suzuki, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/855,503

(22) Filed: May 28, 2004

(65) Prior Publication Data
US 2004/0251238 A1 Dec. 16, 2004

(30) Foreign Application Priority Data

Jun. 10, 2003 (JP) ........................................ 2003/165056

(51) Int. Cl.⁷ .............................. B23H 7/02; B23H 7/20
(52) U.S. Cl. .................................... 219/69.12; 700/162
(58) Field of Search .......................... 219/69.12, 69.17; 700/162, 184

(56) References Cited

U.S. PATENT DOCUMENTS 6,721,621 B1 * 4/2004 Naka et al. ................. 700/162

FOREIGN PATENT DOCUMENTS

| EP | 1 117 019 | 7/2001 |
| JP | 11-224116 A * | 8/1999 |
| JP | 2000-132214 | 5/2000 |
| JP | 2000-132222 | 5/2000 |
| JP | 2002-268716 | 9/2002 |

OTHER PUBLICATIONS

Alan Christman "EdgeCAM Solid Machinist Review by CIMdata," Apr. 2002, pp. 1–10.
Patent Abstract of Japanese Publication No. 61 111847 dated May 29, 1986.
Patent Abstract of Japanese Publication No. 58 217223 dated Dec. 17, 1983.

* cited by examiner

Primary Examiner—Geoffrey S. Evans
(74) Attorney, Agent, or Firm—Staas & Halsey LLP

(57) ABSTRACT

A machining monitor has a depicting function for depicting the machining status of a wire electric discharge machine controlled by a numerical control device. The machining monitor has current position depicting means for depicting a current position according to current position information obtained during machining by the wire electric discharge machine and/or during an operation check by depicting, and has workpiece shape depicting means for depicting a workpiece shape according to workpiece shape information obtained during machining and/or workpiece shape information during an operation check by depicting. The machining monitor displays the workpiece shape and current position concurrently.

9 Claims, 10 Drawing Sheets

OBTAINING CURRENT POSITION INFORMATION

MONITORING DURING MACHINING

[ FIG. 10 ]
EXEMPLARY DRAWING FOR MACHINING MONITORING
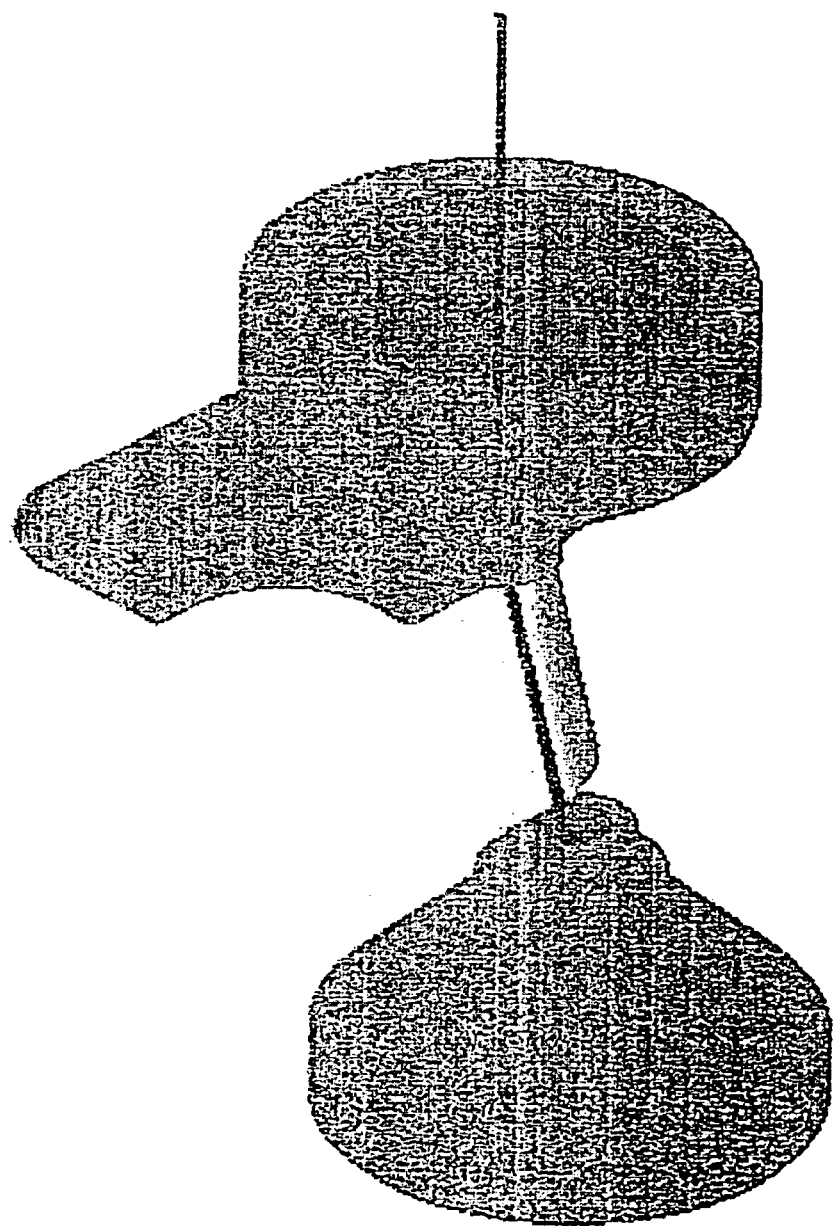

[ FIG. 11A ]
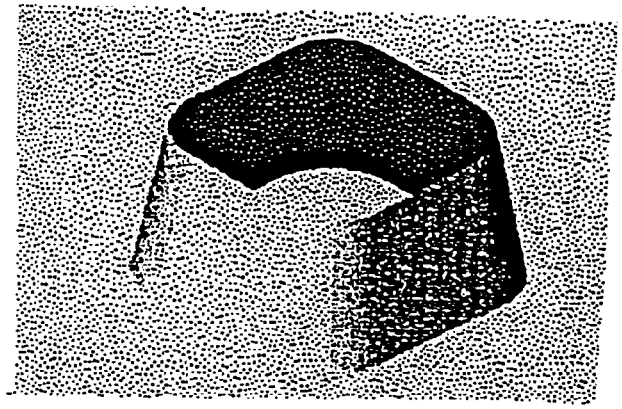
EXEMPLARY DRAWING ON NC PROGRAM
GENERATING APPARATUS
[ FIG. 11B ]
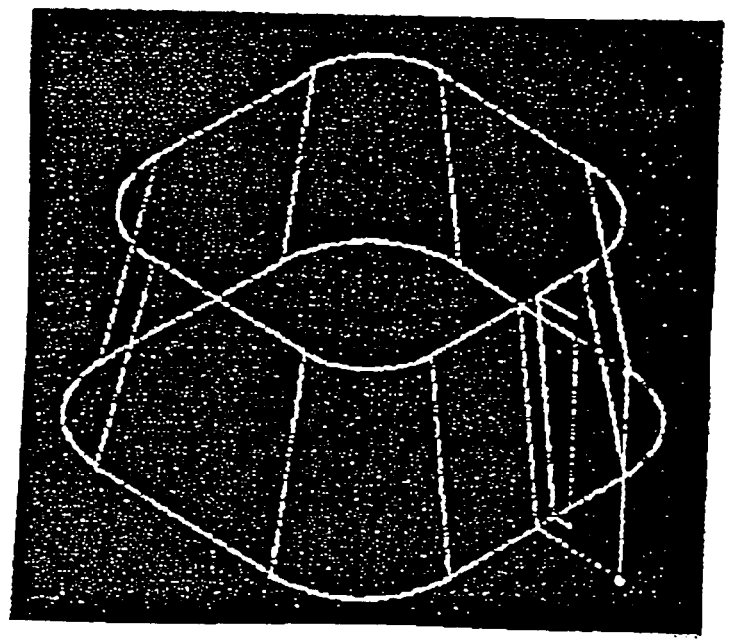
EXEMPLARY DRAWING ON WIRE ELECTRIC
DISCHARGE MACHINE

MACHINING MONITOR

BACKGROUND OF THE INVENTION

1. Field of the Invention

The present invention relates to a machining monitor for a wire electric discharge machine.

2. Description of the Related Art

A wire electric discharge machine feeds an electrode wire in the axial direction thereof, moves a workpiece relative to the electrode wire in a direction approximately perpendicular to the axial direction, and applies voltage pulses between the electrode wire and workpiece while directing machining fluid from a nozzle toward the portion to be machined, thereby machining the workpiece by electrical discharge.

One type of wire electric discharge machine has a numerical control device; a numerical control (NC) program generating apparatus is used to create an NC program for machining the workpiece to a prescribed shape, and the workpiece is machined by using the NC program to drive the numerical control device.

The NC program generating apparatus has depicting functions for depicting the shape of the workpiece. NC program generation is assisted by using these depicting functions to display the workpiece shape on a screen. FIG. 11A shows an exemplary drawing depicted by an NC program generating apparatus.

Some wire electric discharge machines have functions for displaying actual machining traces on a display screen. In the configuration shown in FIG. 12A, a personal computer (PC) 110 and an NC controller 121 are interconnected by a bidirectional signal line so that the PC can be used for monitoring purposes. Machining data is created on the PC 110 and operational status is output from the NC controller 121 in the form of M codes or the like, enabling the PC 110 to monitor the statuses of the machining apparatus 120 and NC controller 121. FIG. 11B shows an exemplary drawing depicted by a wire electric discharge machine.

As described above, the NC program generating apparatus displays only the workpiece shape and the wire electric discharge machine displays only the machining trace; they are not designed to relate the workpiece shape to the actual machining trace of the wire electric discharge machine, so that any means for mutually relating them are not provided. In the conventional technique, therefore, it is not possible to display the workpiece shape and the actual machining trace at the same time and visually check whether or not the machining operation being performed is appropriate for machining the workpiece. It is also impossible to monitor the machining status on a monitor or another external device, because there is no means by which the external device can directly obtain positional information from the wire electric discharge machine.

One existing problem has therefore been that, although a machining trace can be depicted on the wire electric discharge machine from the current position status, enabling the trace to be visually checked, the shape of the workpiece cannot be displayed in this visual check.

In addition, the machining trace depends on various settings of the wire electric discharge machine, such as an offset setting and a corner radius-of-curvature setting, so the machining trace does not always match the contours of the target workpiece shape. From only the visual check of the machining trace on the wire electric discharge machine, therefore, it is not possible to tell whether the workpiece is being machined to the target shape.

Japanese Patent Applications Laid-Open 2002-268716, 2000-132214, and 2000-132222 disclose monitoring schemes in which machine screens displaying machining traces are displayed and monitored on a remote external device rather than being displayed at the wire electric discharge machine as described above.

The remote monitoring/control apparatus of the NC machining apparatus disclosed in Japanese Patent Application Laid-Open 2002-268716 has multiple systems 130a, 130b, 130c each including a server personal computer (PC) 110 as well as a machining apparatus 120 and NC controller 121, as shown in FIG. 12B; each server PC 110 receives coordinate axis data output from the control axes of the machining apparatus 120; a client PC 100 receives this data from the server PC 110, thereby enabling remote monitoring and remote control.

In Japanese Patent Application Laid-Opens 2000-132214 and 2000-132222, the server PC is operable as a Web server and its Web server functions are used for remote monitoring and remote control.

In the above conventional configuration having a server PC on the machining apparatus side, a problem is that a server PC is required for each machining apparatus. In the above conventional configurations using Web server functions, depicting on the external device depends on the depicting functions of the machining apparatus, so depicting functions such as zooming, scaling, and changing the point of view are restricted.

SUMMARY OF THE INVENTION

The machining monitor according to the present invention obtains workpiece shape information used for drawing a workpiece shape and obtains current position information from a numerical control device that numerically controls a machining apparatus. The machining monitor then uses the obtained workpiece shape information and current position information to perform depicting, thereby enabling the workpiece shape and current position to be displayed concurrently.

The machining monitor of the present invention has a depicting function for depicting the machining status of a wire electric discharge machine controlled by a numerical control device. The machining monitor has position information obtaining means for obtaining, from the numerical control device that controls the wire electric discharge machine, current position information at the time of machining by the wire electric discharge machine and/or current position information at the time of an operation check by depicting, and current position depicting means for depicting the current position according to the current position information obtained by the position information obtaining means. The machining monitor further has workpiece shape information obtaining means for obtaining workpiece shape information during machining and/or workpiece shape information during an operation check by depicting, and workpiece shape depicting means for depicting a workpiece shape according to the obtained workpiece shape information.

The current position depicting means displays machining status according to the current position information obtained by the position information obtaining means from the numerical control device. The current position information includes information about the positions of an upper guide and/or a lower guide. The current position depicting means forms depicting information for depicting the current depicting status as visual information. The current machining status can be displayed on a display means according to the depicting data.

According to the workpiece shape information obtained by the workpiece shape information obtaining means, the workpiece shape depicting means forms depicting data that represents the intended shape of the workpiece to be machined as visual information. The workpiece shape can be displayed on a display means according to the depicting data.

The workpiece shape information can be obtained from a numerical control program that controls the numerical control device, and can be input not only from the numerical control program generating apparatus that generates the numerical control program but also from the wire electric discharge machine driven by the numerical control device.

The present invention enables the current position and workpiece shape to be depicted concurrently on a single external device by combining the position information obtaining means and current position depicting means with the workpiece shape information obtaining means and workpiece shape depicting means.

The machining monitor according to the present invention further has wire position obtaining means for obtaining a wire position from the current position information, monitoring means for monitoring the presence and absence of interference between the wire and workpiece based on the wire position information and workpiece shape information, and display means for displaying the monitoring result.

Since, in the machining monitor, the wire position obtaining means obtains the wire position from the current position information, the monitoring means can monitor whether the wire and workpiece interfere from the wire position information and workpiece shape information. If interference occurs, the monitoring means displays a warning or changes the depicting status by, for example, changing the drawing color or blinking the drawing, in order to indicate the interference.

The machining monitor according to the present invention can be provided independently or can be disposed in the NC program generating apparatus that generates the NC program.

The machining monitor of the present invention can be configured in such a way that it can monitor the machining statuses of a plurality of wire electric discharge machines. In this configuration, the position information obtaining means obtains current position information on the plurality of wire electric discharge machines, and the workpiece shape information obtaining means obtains workpiece shape information on a plurality of workpieces. A pair of current position of a wire electric discharge machine and workpiece shape in association with this wire electric discharge machine, selected from among a plurality of the above pairs, is drawn concurrently.

For an arbitrary wire electric discharge machine selected from the plurality of wire electric discharge machines, the current position and workpiece shape can thereby be displayed and monitored concurrently.

The machining monitor and wire electric discharge machines can be interconnected via a network. The network interconnection enables an operation check by depicting to be performed at a remote site.

BRIEF DESCRIPTION OF THE DRAWINGS

The purposes and advantages of the present invention, including those described above, will be clarified by reference to the attached drawings in combination with the description of the embodiment presented below. Of these drawings:

FIG. 10 shows an exemplary drawing depicted by the machining monitor of the present invention;

FIG. 11A shows an exemplary drawing depicted by a conventional NC program generating apparatus, and FIG. 11B shows an exemplary drawing depicted by a conventional wire electric discharge machine.

DESCRIPTION OF THE EMBODIMENTS

An embodiment of the present invention will be described below in detail with reference to the drawings.

Figure 1:
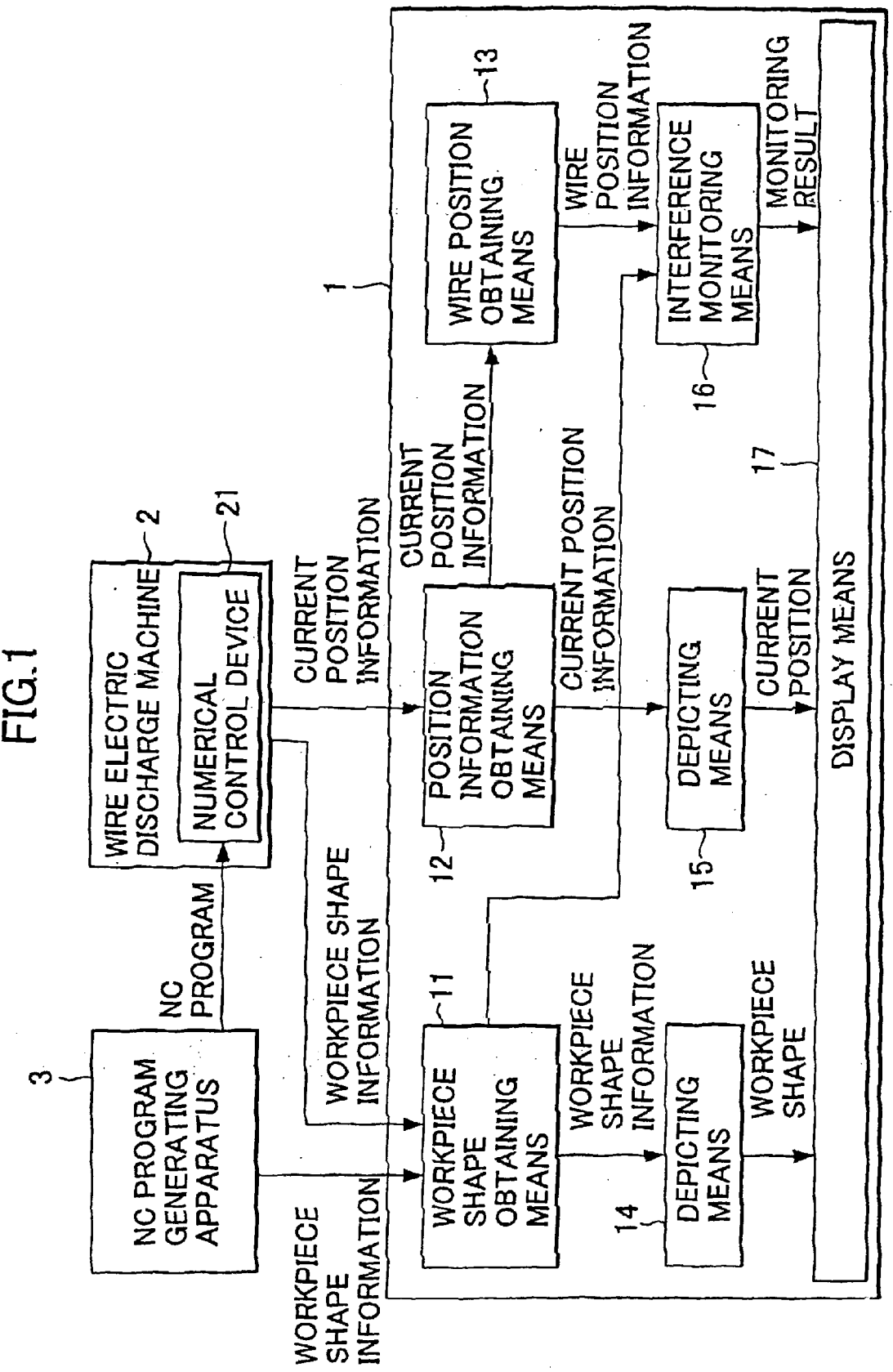
FIG. 1 is a schematic block diagram of a configuration of the machining monitor of the present invention, in a wire electric discharge machine.

FIG. 1 is a schematic block diagram of a configuration of the machining monitor of the inventive wire electric discharge machine.

In FIG. 1, the machining monitor 1 displays the machining status of a wire electric discharge machine 2 by simultaneously displaying both the current position indicating the actual machining status and the shape of the workpiece.

The wire electric discharge machine 2 has a numerical control device 21; machining is performed under the control of the numerical control device 21. The NC program that drives the numerical control device 21 can be generated by an NC program generating apparatus 3. The NC program generating apparatus 3 generates an NC program for machining the workpiece to the target shape. Workpiece shape information is also generated at the same time.

The machining monitor 1 has a first structure for depicting and displaying a workpiece shape and a second structure for depicting and displaying a current position. The first structure comprises workpiece shape obtaining means 11 for obtaining workpiece shape information, and depicting means 14 for depicting the workpiece shape according to the obtained workpiece shape information.

The workpiece shape obtaining means 11 obtains information on the workpiece shape through the NC program generating apparatus 3 or the numerical control device 21 in the wire electric discharge machine 2. The workpiece shape information may be one representing a three-dimensional shape such as IGES (Initial Graphics Exchange Specification), DXF (drawing interchange file), and solid data, which are well known. The depicting means 14 uses the workpiece shape information obtained by the workpiece shape obtaining means 11 to form depicting data for displaying the workpiece shape, and displays the depicting data on the display screen of a display means 17.

The second structure, for depicting and displaying the current position, comprises position information obtaining means 12 for obtaining current position information from the numerical control device 21 in the wire electric discharge machine 2, and depicting means 15 for depicting the current position according to the obtained current position information.

The position information obtaining means 12 obtains the current position information, indicating the machining position at which machining is currently being performed, from the numerical control device 21 in the wire electric discharge machine 2. The current position information may include information on the positions of the upper guide and lower guide.

The depicting means 15 uses the current position information obtained by the position information obtaining means 12 to form depicting data for displaying the current position, and displays the depicting data on the display screen of the display means 17. Therefore, the depicting means 14 and 15 display the workpiece shape and current position concurrently on the display screen of the display means 17.

In the depicting means 14 and 15, an application program provided in the machining monitor or another external device can select an arbitrary depicting method, such as zooming, scaling, or changing the point of view.

The machining monitor 1 has a further structure for monitoring interference between the wire and workpiece. The interference monitoring structure comprises wire position obtaining means 13 for obtaining current position information from the position information obtaining means 12 and determining the wire position, and interference monitoring means 16 for monitoring interference between the wire and workpiece shape according to the obtained wire position. The wire position obtaining means 13 receives current position information from the position information obtaining means 12, and determines the wire position from the current machining position. The interference monitoring means 16 receives wire position information from the wire position obtaining means 13 and workpiece shape information from the workpiece shape obtaining means 11, and monitors whether the wire is interfering with the workpiece or not. The interference monitoring means 16 then displays the monitoring result on the display screen of the display means 17, and if there is interference, issues an alarm to call the user's attention. The alarm may be displayed as an alarm indication, for example, or by changing the drawing color.

In addition to displaying workpiece shape information and current position information during actual machining, the machining monitor 1 can display these information items during an operation check without actually performing any machining.

In actual machining, workpiece shape information and current position information are displayed. As shown in FIG. 1, the workpiece shape obtaining means 11 obtains shape information (workpiece shape information) of the intended workpiece from the NC program generating apparatus 3, and the depicting means 14 forms data for depicting the workpiece shape according to the workpiece shape information and displays the shape on the display means 17. Furthermore, the position information obtaining means 12 obtains, from the numerical control device 21 of the wire electric discharge machine 2, the information giving the current machining position and the positions of the upper and lower guides. From this position information, the depicting means 15 forms data for depicting the current position and uses the depicting data to display the current position on the display means 17.

Figure 2:
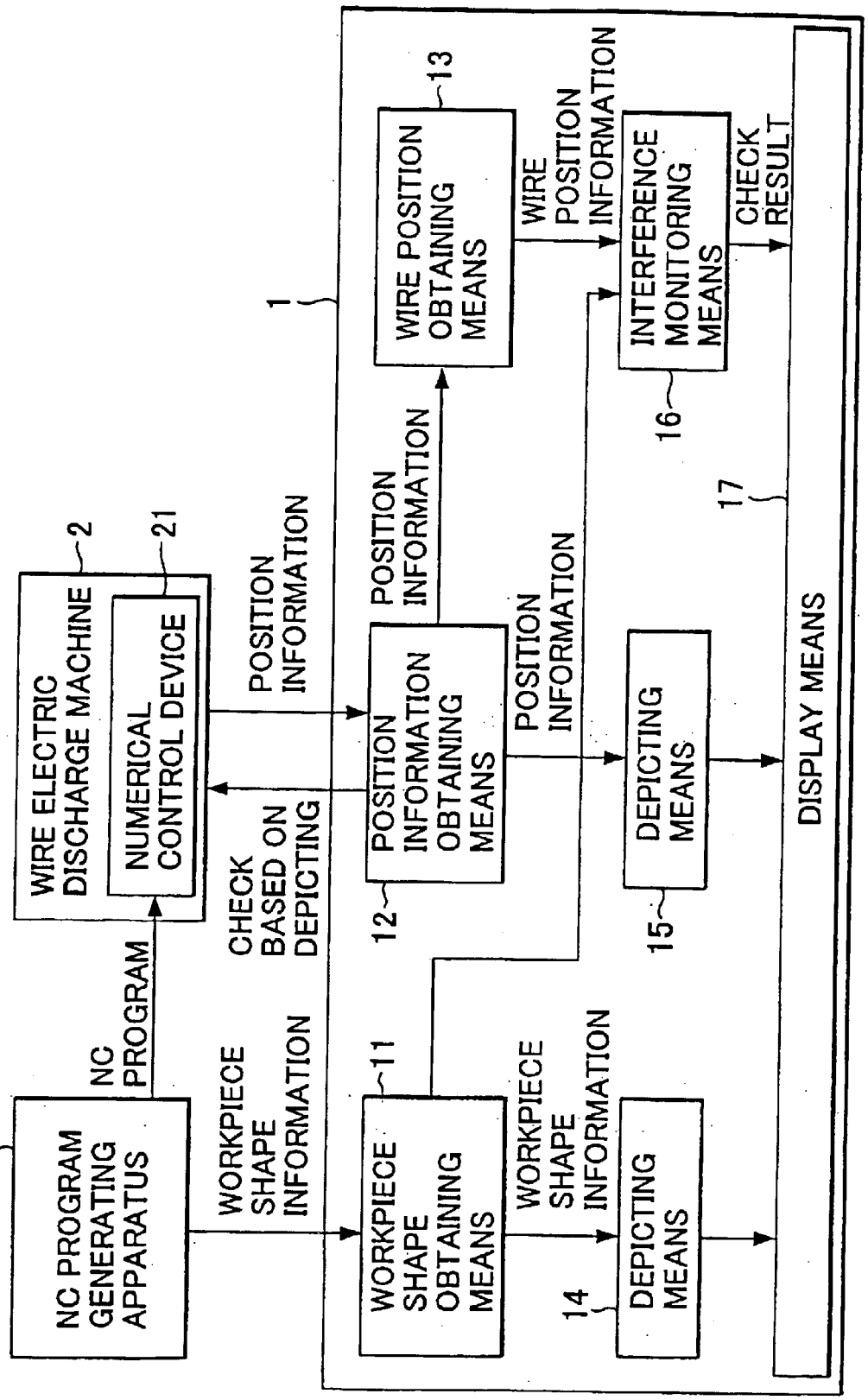
FIG. 2 is a schematic block diagram illustrating an operation check by depicting.

FIG. 2 shows the flow of an operation check by depicting. When the workpiece shape and current position information are displayed in order to make an operation check by depicting the information without actually carrying out machining, the workpiece shape obtaining means 11 obtains shape information (workpiece shape information) of the target workpiece from the NC program generating apparatus 3, in the same way as in actual machining, and the depicting means 14 forms data for depicting the workpiece shape according to the workpiece shape information and draws the shapes on the display means 17.

The position information obtaining means 12 outputs a depicting check command to the numerical control device 21 in the wire electric discharge machine 2. Upon reception of the depicting check command, the numerical control device 21 forms position information sequentially according to the NC program, and outputs the formed position information to the position information obtaining means 12 of the machining monitor 1. The position information obtaining means 12 obtains position information based on NC program operations. According to the position information, the depicting means 15 forms data for depicting the current position and draws the current position on the display means 17.

The wire position obtaining means 13 receives current position information from the position information obtaining means 12, and determines the wire position from the input information (received current machining position), in the same way as in actual machining. The interference monitoring means 16 receives wire position information from the wire position obtaining means 13 and workpiece shape information from workpiece shape obtaining means 11, and monitors whether the wire interferes with the workpiece or not. The interference monitoring means 16 then displays the result of monitoring on the display screen of the display means 17, and if there should be an interference, issues an alarm to call the user's attention.

Operation procedures of the machining monitor will be described below with reference to the flowcharts in FIGS. 3 to 7.

Figure 3:
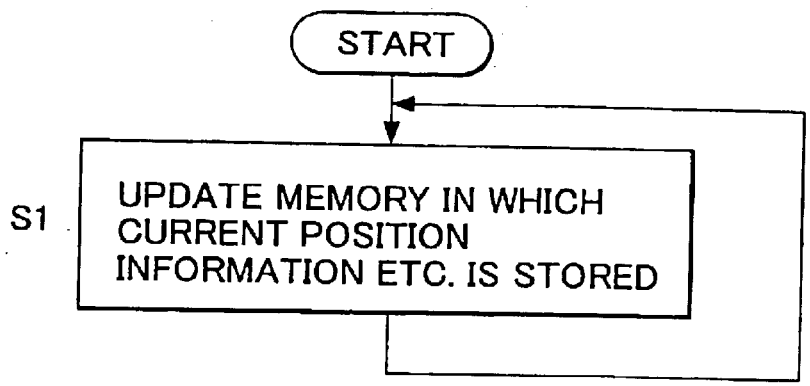
FIG. 3 is a flowchart illustrating the obtaining of current position information.

FIG. 3 is a flowchart illustrating the obtaining of current position information. The operation of the wire electric discharge machine 2 is controlled by the numerical control device 21 according to the NC program, thus enabling the current position information on the wire electric discharge machine to be obtained from the position information formed by the numerical control device 21.

The position information obtaining means 12 sequentially obtains information on the current position, information on the positions of the upper and lower heads, and other information formed by the numerical control device 21, and stores the obtained information in a memory, updating the memory. Therefore, the position information stored in the memory is always current position information. The depicting means 15 can use the position information stored in the memory to form depicting data for depicting the current position. The wire position obtaining means 13 can also use the position information stored in the memory to obtain the current wire position (step S1).

Figure 4:
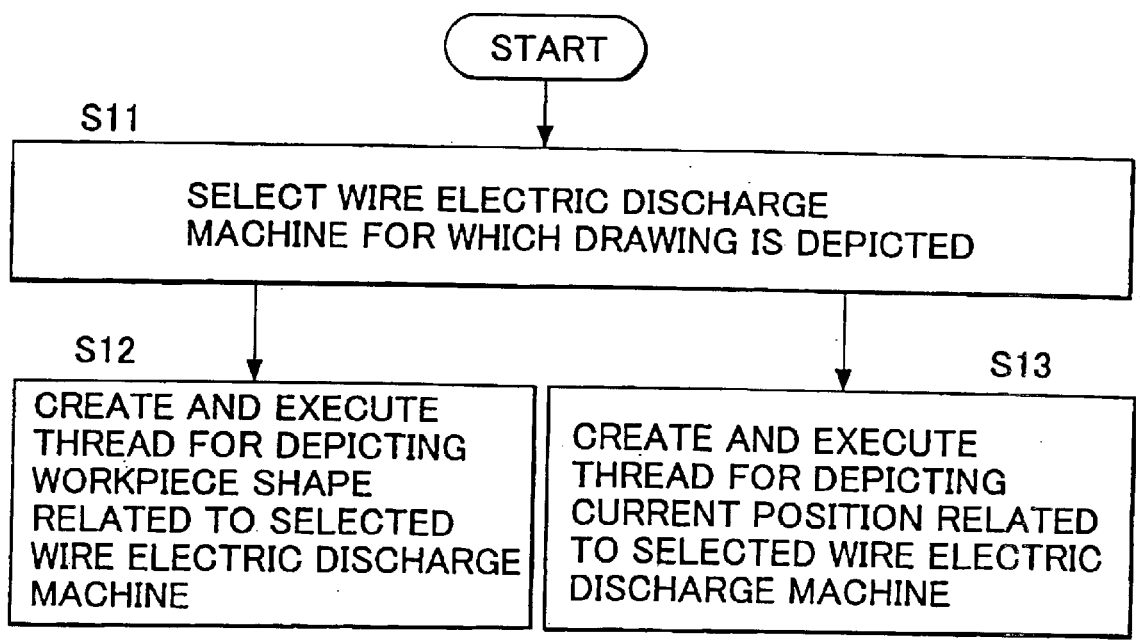
FIG. 4 is a flowchart illustrating monitoring during machining.

FIG. 4 is a flowchart illustrating monitoring during machining. The machining monitor of the present invention can draw and display a workpiece shape and current position concurrently for each of a plurality of wire electric discharge machines. A wire electric discharge machine for which drawing is depicted is selected first (step S11). Then, a thread for depicting a workpiece shape related to the selected wire electric discharge machine is generated and executed (step S12), and another thread for depicting the current position, also related to the selected wire electric discharge machine, is generated and executed (step S13).

When a thread for depicting a workpiece shape and another thread for depicting a current position are generated and executed as described above, the workpiece shape and current position information can be depicted and displayed concurrently for each wire electric discharge machine.

A thread is an execution unit in a program. In a multi-thread operating system, a plurality of threads can be executed in a program. Threads in the same process can share memory resources. When a thread for depicting a workpiece shape and another thread for depicting a current position are generated, therefore, a process for depicting the workpiece shape and another process for depicting the current position can be executed concurrently. This is also true for operation checks.

Figure 5:
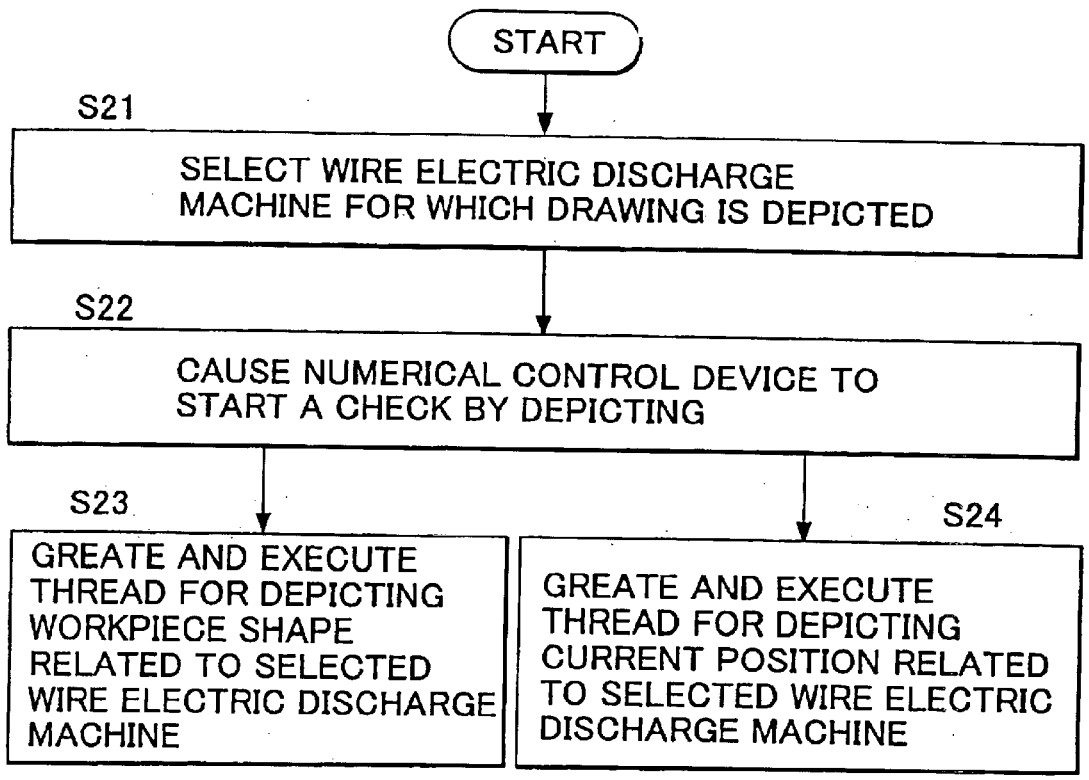
FIG. 5 is a flowchart illustrating monitoring operations during an operation check by depicting.

FIG. 5 is a flowchart illustrating the monitor operations in an operation check by depicting. As with a check during machining, a wire electric discharge machine for which operations are checked is selected first (step S21), and then the numerical control device in the selected wire electric discharge machine is caused to start a depicting check (step S22). Upon reception of a depicting check command from the machining monitor, the numerical control device generates and executes a thread for depicting the workpiece shape (step S23), and generates and executes another thread for depicting the current position (step S24).

Figure 6:
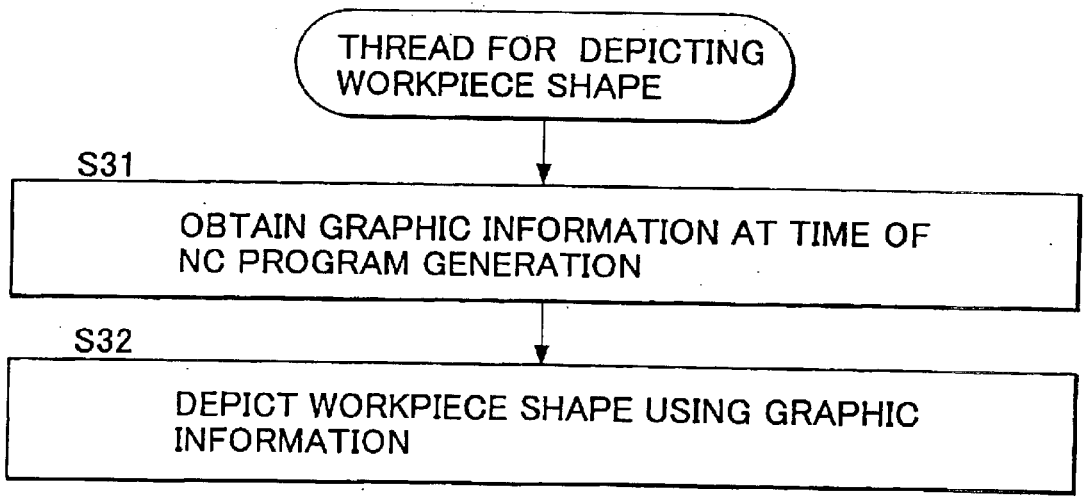
FIG. 6 is a flowchart illustrating the creation of a thread for depicting workpiece shapes.

FIG. 6 is a flowchart illustrating the creation of a thread for depicting workpiece shapes. The depicting means 14 for depicting the workpiece shape obtains graphic information (workpiece shape information) at the time of NC program generation (step S31), and generates data for depicting the workpiece shape from the graphic information (step S32).

Figure 7:
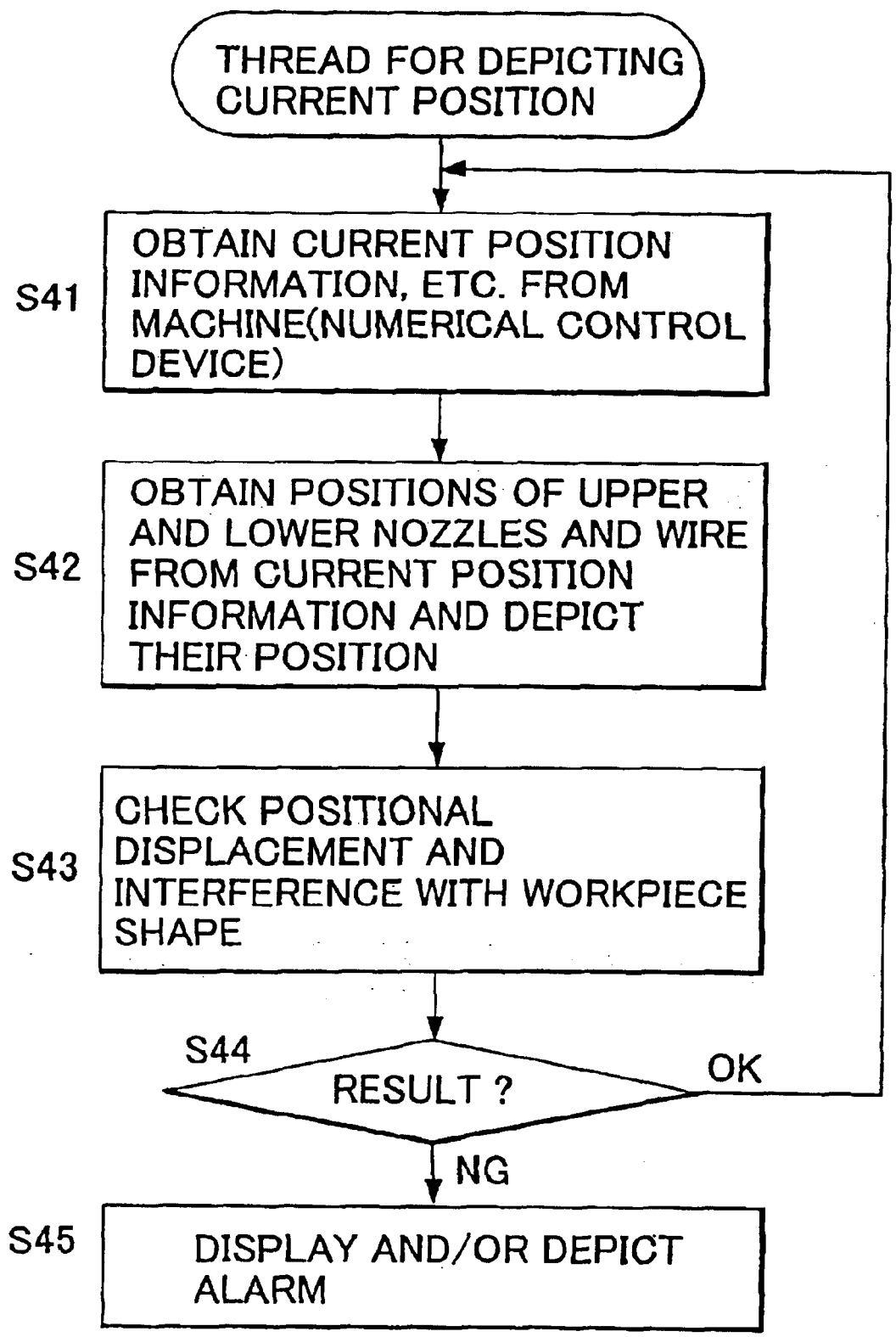
FIG. 7 is a flowchart illustrating the creation of a thread for depicting current position information.

FIG. 7 is a flowchart illustrating the creation of a thread for depicting current position information. An example of executing both a depicting process and an interference monitoring process will be given below.

The depicting means 15 for depicting current position information obtains current position information from the numerical control device of the wire electric discharge machine (step S41). The depicting means then obtains the wire position, as well as information on the positions of mechanical parts, including the upper nozzle and lower nozzle positions, from the obtained current position information, and draws these positions (step S42).

Workpiece shape information is also obtained; the position of the workpiece shape is compared with the mechanical part position information obtained in step S42, such as the positions of the upper nozzle and lower nozzle, to determine whether there is a positional displacement or not; the wire position obtained in step S42 is compared with the workpiece shape to determine whether the wire interferes with the workpiece shape or not (step S43).

If there is neither positional displacement nor interference in step S43, processing returns to step S41 where the next current position information is obtained, and then processing in the steps described above is repeated (step S44).

If there would be a positional displacement or interference in step 43, an alarm is indicated and the positional displacement or interference status is drawn (step S45).

Figure 8A:
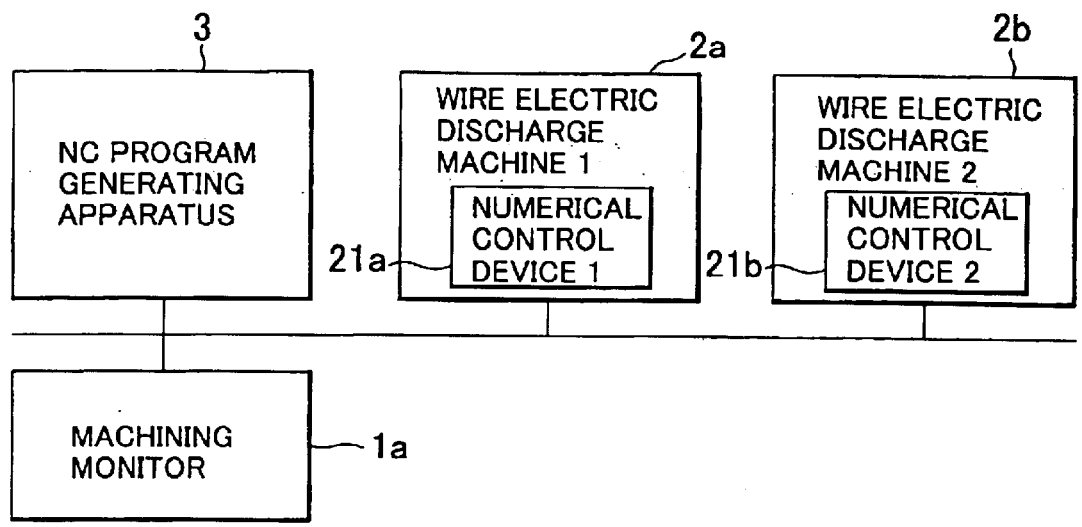
FIGS. 8A to 8C are schematic diagrams of exemplary configurations for monitoring a plurality of wire electric discharge machines.
Figure 8B:
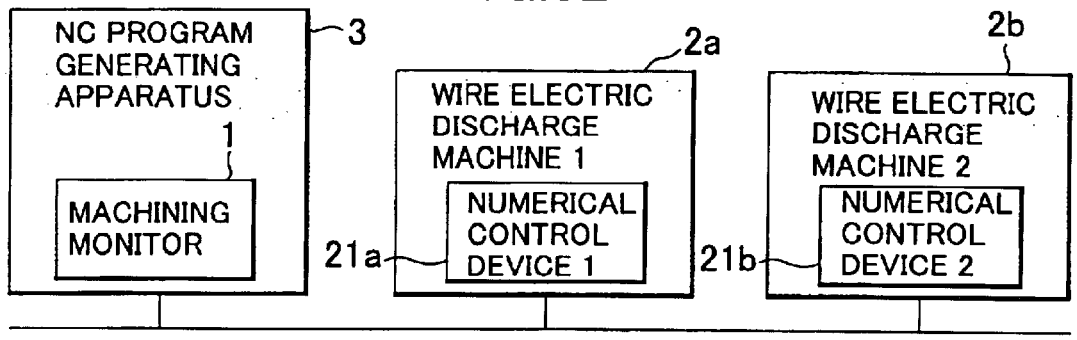
Figure 8C:
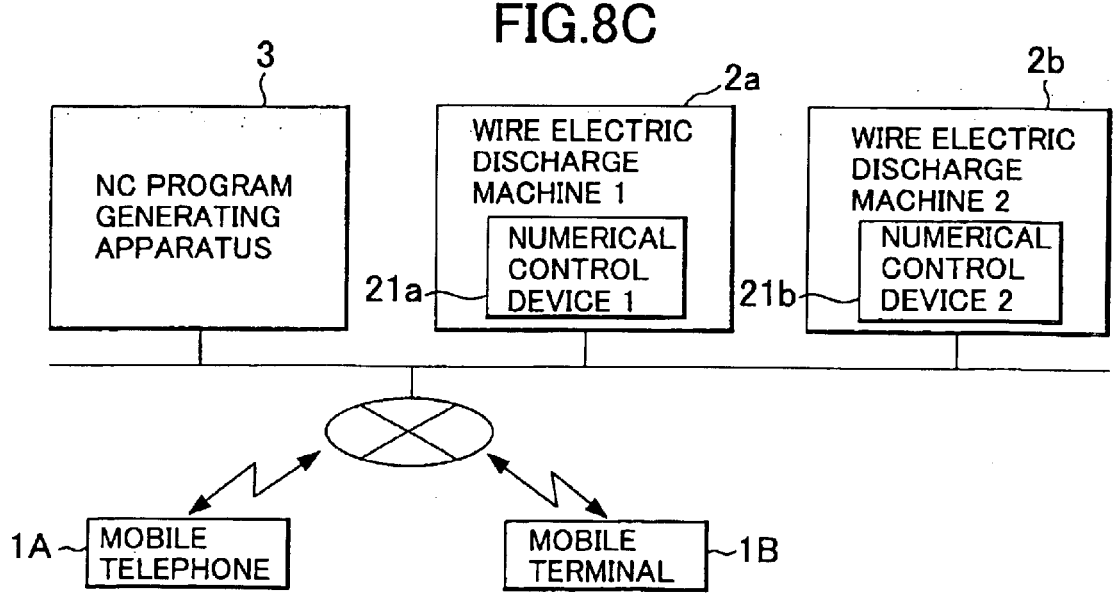

The inventive machining monitor can handle a plurality of wire electric discharge machines, so the machining monitor can monitor the machining statuses of the plurality of wire electric discharge machines. FIGS. 8A to 8C are schematic diagrams of exemplary configurations for monitoring a plurality of wire electric discharge machines.

In FIG. 8A, the machining monitor 1 is connected to wire electric discharge machines 2a, 2b and to the NC program generating apparatus 3, through a network such as a local area network (LAN). The machining monitor 1 obtains from the NC program generating apparatus 3 shape information on the workpieces to be machined by the wire electric discharge machines 2a, 2b, and obtains current position information from the numerical control devices 21a, 21b provided in the respective wire electric discharge machines 2a, 2b, whereby the machining monitor 1 can display the workpiece shape and current position concurrently for each of the wire electric discharge machines.

Figure 9:
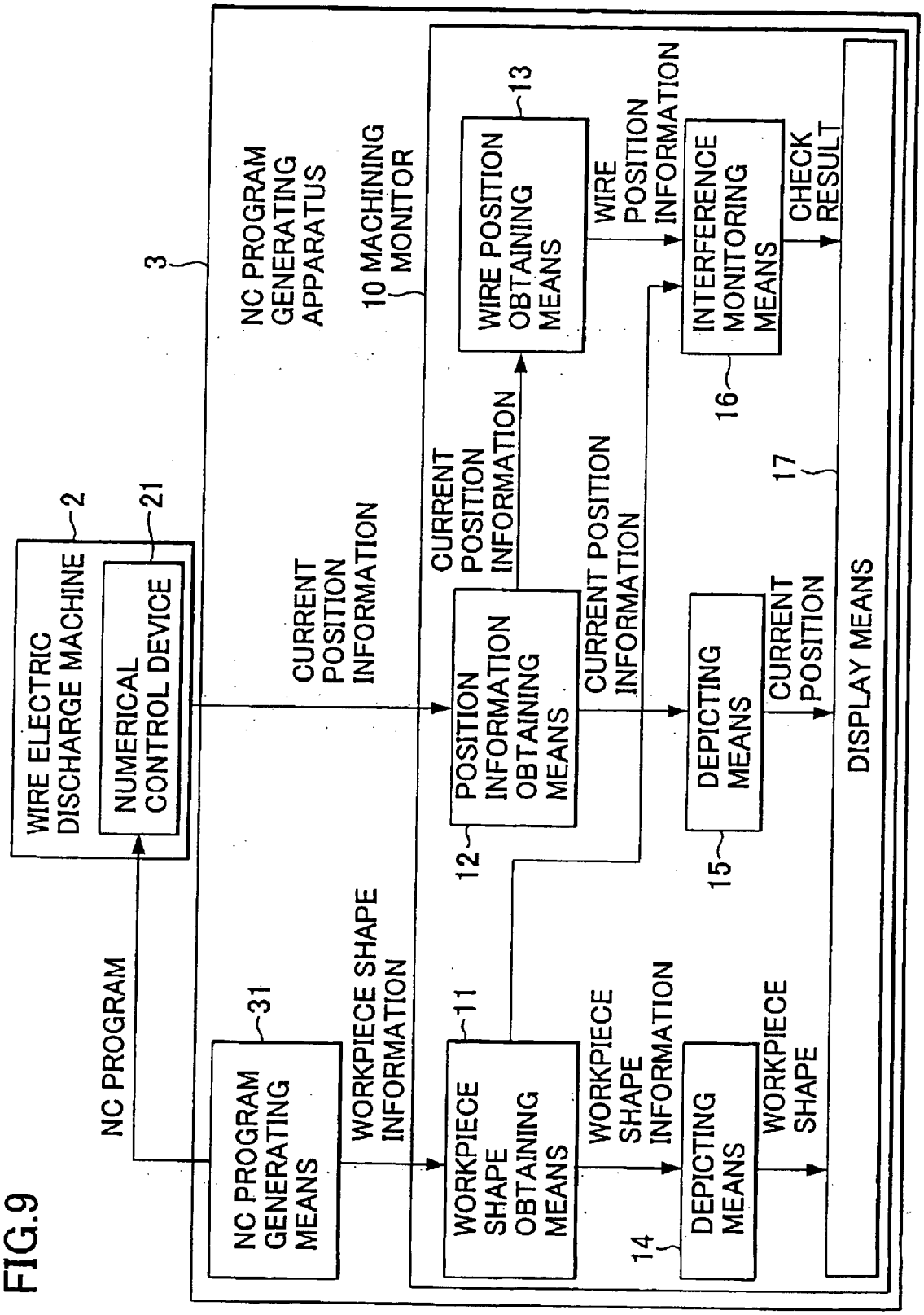
FIG. 9 shows an exemplary configuration of the NC program generating apparatus shown in FIGS. 8A to 8C.
Figure 12A:
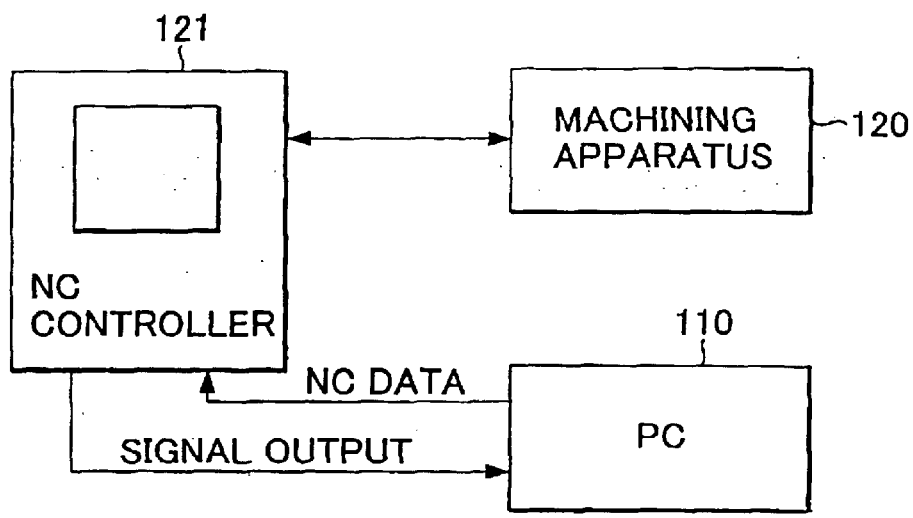
FIGS. 12A and 12B show the configurations of conventional machining monitors.
Figure 12B:
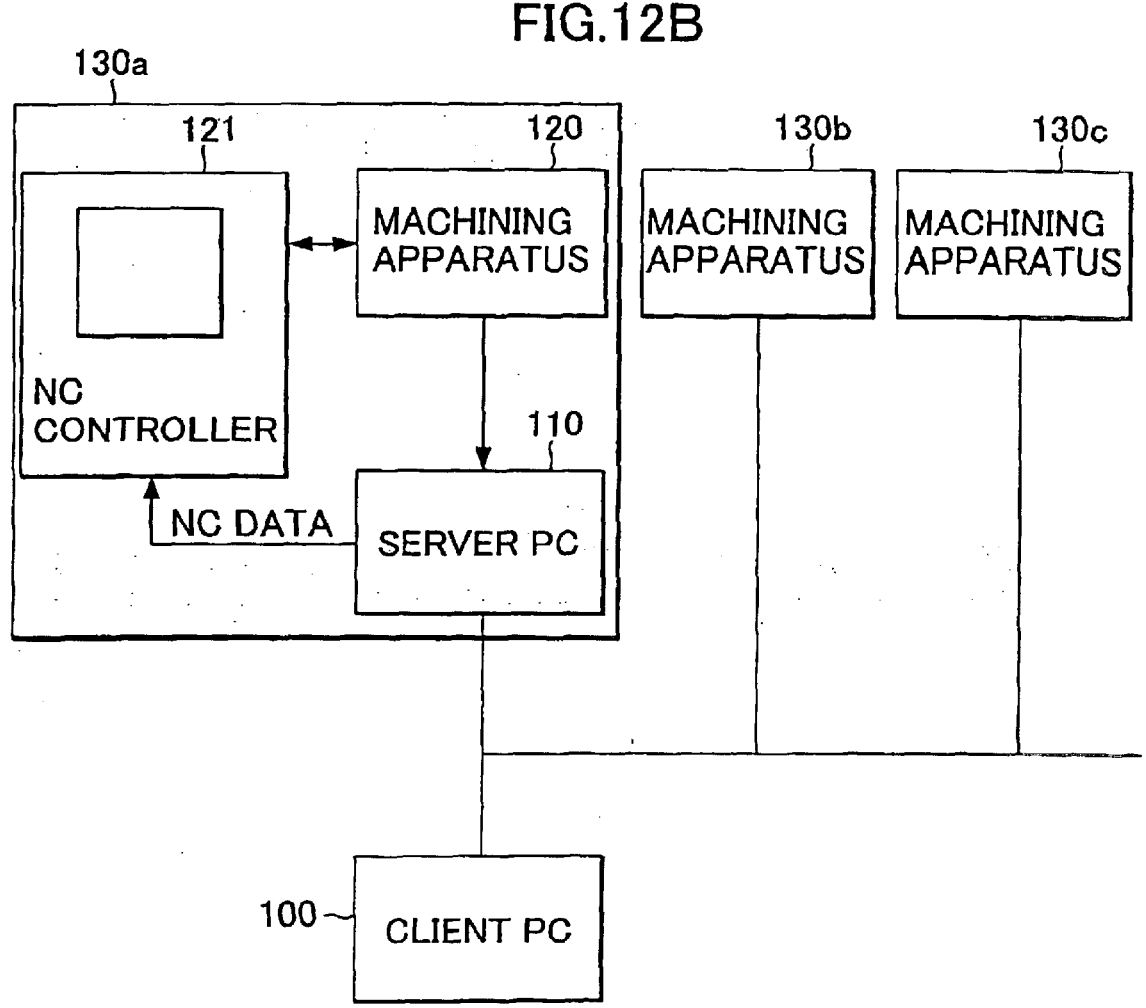
Figure 5:
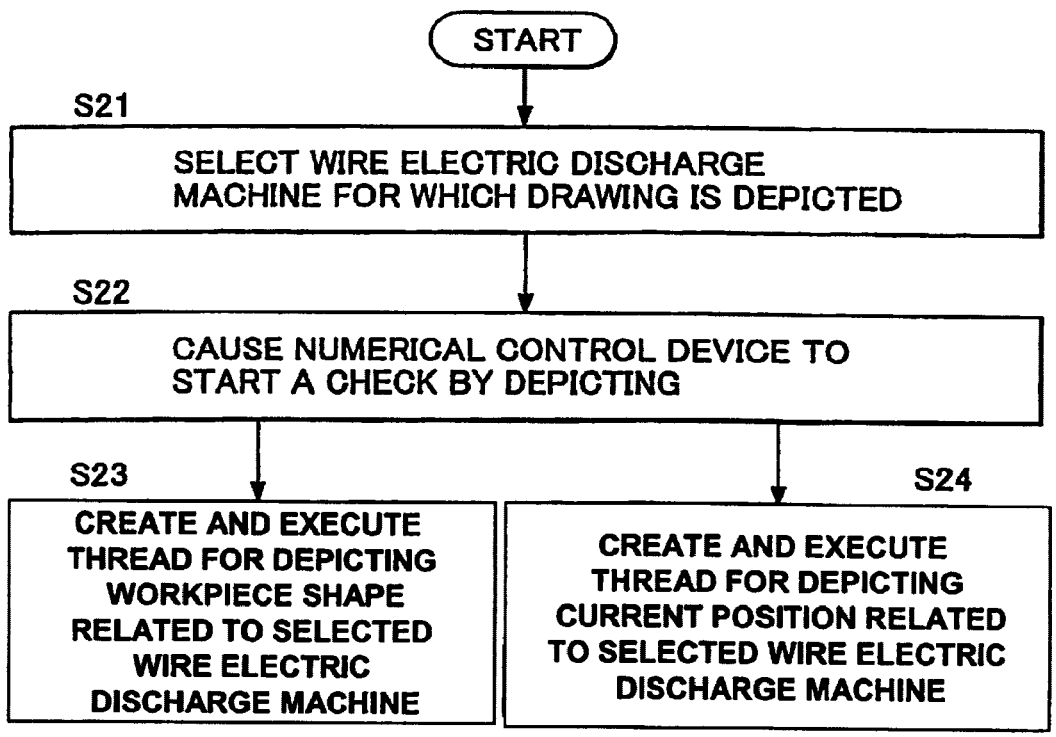
Figure 6:
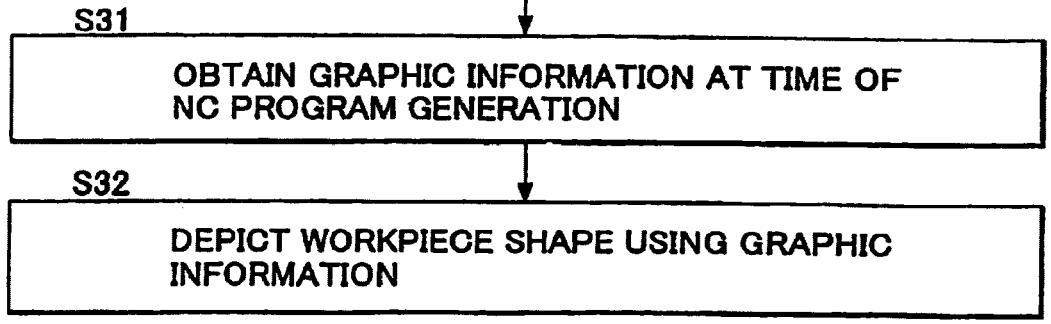

The machining monitor can also be incorporated in the NC program generating apparatus, as shown in the configuration in FIG. 8B. FIG. 9 illustrates an exemplary configuration of an NC program generating apparatus of this type.

The NC program generating apparatus 3 has an NC program generating means 31 and a machining monitor 10. The machining monitor 10 has the same configuration as the machining monitor shown in FIG. 1, so further description will be omitted.

As shown in FIG. 9, the NC program generating means 31 sends a generated NC program to the numerical control device 21 in the wire electric discharge machine 2, and sends workpiece shape information to the machining monitor 10. The numerical control device 21 controls mechanical parts according to the NC program sent from the NC program generating means 31. The mechanical parts current position information based on the NC program is sent to the position information obtaining means 12 in the machining monitor 10.

In FIG. 8B, the machining monitor 10 in the NC program generating apparatus 31 obtains current position information from the numerical control device 21a in the wire electric discharge machine 2a or from the numerical control device 21b in the wire electric discharge machine 2b, and displays the current position.

The machining monitor of the present invention can be applied to many types of external devices; as shown in FIG. 8C, for example, the machining monitor may be a terminal such as a personal computer connected via a wireless network or an external device such as a mobile telephone 1A or mobile terminal 1B having depicting functions.

With this machining monitor, an operator can check from a remote site whether or not a machining apparatus such as a wire electric discharge machine is performing machining to the target workpiece shape.

FIG. 10 shows an example of depicting by the machining monitor of the present invention, and drawing of the workpiece shape obtained from the NC program generating apparatus, as shown in FIG. 11A, and drawing of the current position, as shown in FIG. 11B, are depicted at the same time.

As described above, the machining monitor of the present invention enables visual monitoring and check of machining performed by a wire electric discharge machine according to an NC program generated by the NC program generating apparatus. It can also be visually checked whether the machining operation is suitable for machining the workpiece to the prescribed shape.

Even when the machining operation differs from the actual machining operation due to settings on the wire electric discharge machine or for another reason, an accurate check can be performed easily by depicting a drawing based on the depicting information in the wire electric discharge machine that provides the same specifications as that in the actual machining operation.

The machining monitor of the present invention can display a workpiece shape, machining trace, current position, and other information concurrently on an external device, thereby enabling the machining status to be checked on the external device.

The machining monitor of the present invention also permits an easy check of the machining status of an entire system having a plurality of machines. An alarm can also be displayed so that the part of the workpiece shape at which an abnormal condition has occurred can be visually checked.

As described above, according to the present invention, a workpiece shape and current position can be displayed concurrently on an external device.

What is claimed is:

1. A machining monitor having a depicting function for depicting a machining status of a wire electric discharge machine controlled by a numerical control device, comprising:

position information obtaining means for obtaining, from the numerical control device, current position information at the time of machining by the wire electric discharge machine and/or current position information at the time of an operation check by depicting;

current position depicting means for depicting a current position according to the current position information obtained by the position information obtaining means;

workpiece shape information obtaining means for obtaining workpiece shape information during the machining and/or during the operation check by depicting; and workpiece shape depicting means for depicting a workpiece shape according to the obtained workpiece shape information;

wherein the machining monitor draws the current position and the workpiece shape concurrently.

2. The machining monitor according to claim 1, wherein the current position information includes information about a position of an upper guide and/or a position of a lower guide.

3. The machining monitor according to claim 1, wherein the workpiece shape information is obtained from a numerical control program supplied to the numerical control device.

4. The machining monitor according to claim 3, wherein the workpiece shape information is obtained from a numerical control program generating apparatus that generates a numerical control program supplied to the numerical control device or from the wire electric discharge machine driven by the numerical control device.

5. The machining monitor according to claim 1, further comprising:

wire position obtaining means for obtaining a wire position from the current position information;

monitoring means for monitoring presence and absence of interference between a wire and a workpiece according to the obtained wire position information and the obtained workpiece shape information; and display means for displaying a monitoring result.

6. The machining monitor according to claim 1, wherein the position information obtaining means, the current position depicting means, the workpiece shape information obtaining means, and the workpiece shape depicting means are disposed in a numerical control program generating apparatus that generates a numerical control program supplied to the numerical control device.

7. The machining monitor according to claim 1, wherein:

the position information obtaining means obtains current position information on a plurality of wire electric discharge machines;

the workpiece shape information obtaining means obtains workpiece shape information on a plurality of workpieces; and a pair of current position of a wire electric discharge machine and workpiece shape in association with the wire electric discharge machine, selected from among a plurality of the above pairs, is drawn concurrently.

8. The machining monitor according to claim 1, wherein the machining monitor and the wire electric discharge machine are interconnected via a network.

9. The machining monitor according to claim 8, wherein the network interconnection enables an operation check by depicting to be performed at a remote site.

* * * * *

UNITED STATES PATENT AND TRADEMARK OFFICE
CERTIFICATE OF CORRECTION

PATENT NO.    : 6,897,398 B2
DATED         : May 24, 2005
INVENTOR(S)   : Toshiyuki Ogata et al It is certified that error appears in the above-identified patent and that said Letters Patent is hereby corrected as shown below:

Drawings,
Sheet 4 of 10, FIG. 5, Boxes S23 and S24, change "Greate" to -- Create -- (as shown on the attached page).

Signed and Sealed this

Seventh Day of March, 2006

JON W. DUDAS
*Director of the United States Patent and Trademark Office*

OPERATION CHECK BY DEPICTING